United States Patent
Nasiri et al.

(10) Patent No.: US 6,823,127 B2
(45) Date of Patent: Nov. 23, 2004

(54) APPARATUS FOR HOLDING A FIBER ARRAY

(75) Inventors: Steven S. Nasiri, Saratoga, CA (US); Janusz Liberkowski, San Jose, CA (US); Zhenfang Chen, Cupertino, CA (US); Jeff Jarfa, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 10/236,471

(22) Filed: Sep. 5, 2002

(65) Prior Publication Data

US 2004/0047582 A1 Mar. 11, 2004

(51) Int. Cl.[7] .................................................. G02B 6/00
(52) U.S. Cl. ....................................... 385/137; 385/134
(58) Field of Search .................................. 385/134–139

(56) References Cited

U.S. PATENT DOCUMENTS

| | | | |
|---|---|---|---|
| 4,830,450 A | * | 5/1989 | Connell et al. ................ 385/78 |
| 5,185,846 A | * | 2/1993 | Basavanhally et al. ..... 385/137 |
| 5,281,301 A | * | 1/1994 | Basavanhally ............... 216/24 |
| 5,394,498 A | * | 2/1995 | Hinterlong et al. ......... 385/115 |
| 5,658,364 A | | 8/1997 | De Vore et al. ............. 65/431 |
| 6,027,253 A | | 2/2000 | Ota et al. ...................... 385/83 |
| 6,216,939 B1 | | 4/2001 | Thackara .................. 228/124.6 |
| 6,470,123 B1 | * | 10/2002 | Sherman et al. ............ 385/115 |
| 6,618,541 B2 | * | 9/2003 | Kaiser et al. ............... 385/137 |
| 2001/0051028 A1 | | 12/2001 | Gutierrez et al. ............. 385/85 |
| 2002/0154882 A1 | * | 10/2002 | Moran ......................... 385/137 |
| 2003/0002804 A1 | * | 1/2003 | Trezza et al. ................. 385/59 |
| 2003/0007758 A1 | * | 1/2003 | Rose et al. ................. 385/115 |

* cited by examiner

Primary Examiner—John D. Lee
Assistant Examiner—Scott Alan Knauss
(74) Attorney, Agent, or Firm—Blakely, Sokoloff, Taylor & Zafman LLP

(57) ABSTRACT

Optical fibers are inserted and bonded in a two dimensional array of feedthroughs provided by an insert having a top plate, a bottom plate and a sandwiched spacer plate. Top and bottom plate feature funnel shaped hole sections that capture the approaching fiber end during its insertion. The funnel sections terminate in narrow hole sections that tightly hold the inserted fiber ends. Having top and bottom plate spaced apart provides for high angular precision of the bonded fiber ends with minimal fabrication effort of the insert. Optical fibers may be combined in linear arrays and simultaneously inserted significantly reducing assembly efforts. The insert is attached to a fiber housing and hermetically sealed within an external housing, which features a glass plate to provide beam propagation to and from the fiber ends. An optical gel fills the gap between the insert's output face and the glass plate.

23 Claims, 6 Drawing Sheets

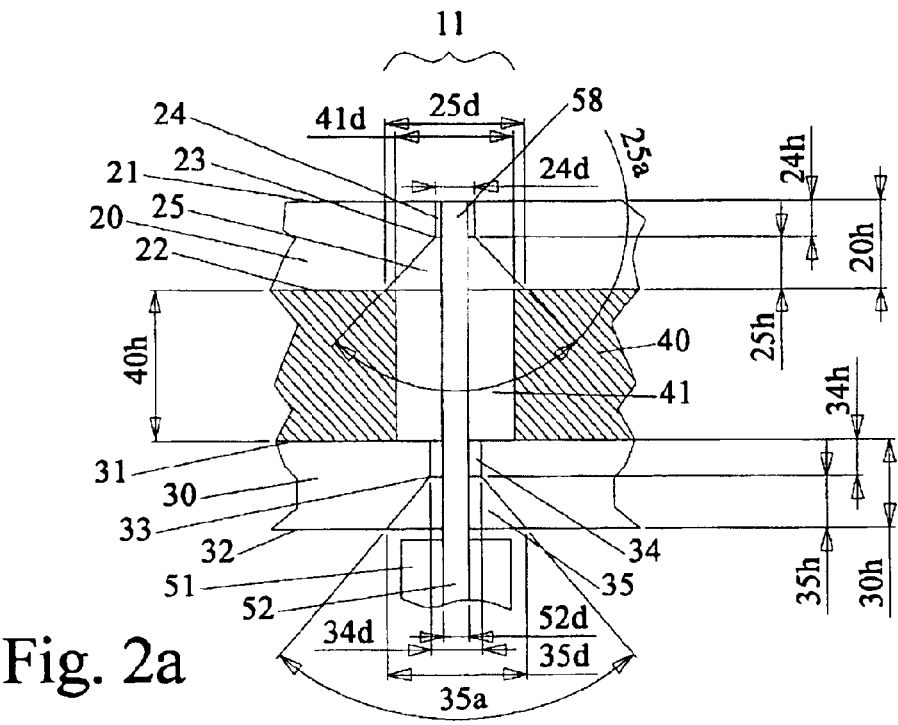
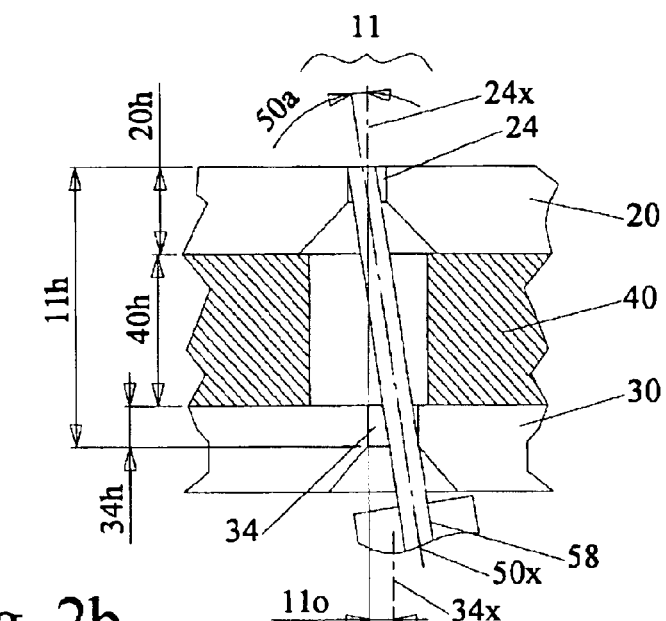

APPARATUS FOR HOLDING A FIBER ARRAY

CROSS REFERENCE

The present application cross-references U.S. patent application Ser. No. 10/236,470, filed Sep. 5, 2002 for a "Method and Apparatus for Applying a Gel" of Janusz Liberkowski, and the U.S. patent application Ser. No. 09/866,063, filed May 21, 2002, abandoned, both of which are hereby incorporated by reference.

FIELD OF THE INVENTION

The present invention relates to devices for holding optical fibers, and in particular to devices for holding optical fibers organized in arrays.

BACKGROUND

Many fields of technology have benefited from the ability to transmit signals via waveguides such as optical fibers. In particular, optical fibers have enabled the construction of various types of local and long-distance communications networks. The signals propagating through an optical network are typically launched and out-coupled from individual optical fibers through their end facets. For example, in optical network components such as optical fiber switches and optical fiber cross connects, signals are out-coupled from one fiber and in-coupled into another fiber.

In accordance with well-known principles of optics, light emitted from the end facet of a fiber diverges in a cone-shaped pattern determined by the numerical aperture N.A.=n sin $\theta_{max}$ of the fiber. In this equation n is the refractive index into which the fiber emits the light and $\theta_{max}$ is the half angle of the cone shaped emission pattern.

In most optical networks and/or components it is important to minimize loss when connecting an optical fiber to an optical system. To accomplish this, the diverging light beams emitted by the optical fibers in the array are typically collimated and/or refocused by lenses. To effectively couple the individual fibers of a fiber array with other optical components or systems, the individual fibers and all other optical elements along the emitting and/or received light paths need to be precisely positioned and aligned. Specifically, precise alignment means that 1) light is emitted from each optical fiber at a precisely known position within the array, 2) light is emitted from each optical fiber at substantially the same angle (i.e., the optical fibers are aligned substantially parallel to each other), 3) light is emitted from each optical fiber at substantially the same distance from the collimating and/or refocusing lenses, and 4) each optical fiber has substantially the same numerical aperture.

The prior art teaches aligning optical fibers in an array of V-grooves. Such arrays typically include a small number of optical fibers (e.g., up to about 64) arranged in parallel in a single plane. For example, U.S. Pat. No. 6,027,253 to Ota et al. discloses an optical fiber array including a V-groove substrate having V-grooves on which optical fibers are arranged and a fiber fix substrate for fixing the optical fibers arranged on the V-grooves. Furthermore, V-groove arrays have also been adapted to requirements that fiber arrays be hermetically sealed to prevent ambient air from entering into the package holding the fiber array. A sealed fiber array and method for its manufacture using V-grooves is taught in U.S. Pat. No. 6,215,944 to Ota et al. Additional improvements to V-groove chips for fiber arrays having a wick stop trench to prevent adhesive moving via capillary action along the length of the V-groove are discussed in U.S. Patent Application Publication 2002/0003933 to Sherrer et al.

Other approaches to providing hermetically sealed packages for fibers are also known. For example, U.S. Pat. No. 6,216,939 to Thackara teaches a method for making a hermetically sealed package comprising at least one optical fiber feedthrough. The package has at least one solder perform between a sealing surface of a lid and a sealing surface of a housing. Applying pressure and heat so as to press the fiber or fibers into the solder seals the assembly. More general teaching on how to achieve fiber optic-to-metal connection seals can be found in U.S. Pat. No. 5,658,364 to DeVore et al.

Fiber arrays disposed on substrates with V-grooves and lodged between substrates as taught by Thackara are mostly suitable for constructing single-plane arrays. As the number of fibers increases such arrays become unwieldy. Many applications like, for example, in telecommunications are expected to require optical fiber arrays including more than one hundred (and potentially more than one thousand) optical fibers. Unfortunately, single-plane arrays are impractical for such applications. Moreover, efficient coupling of light output by an optical fiber array into another optical system becomes more difficult when aligning very large quantities of optical fibers than when dealing with only a few optical fibers.

Alternative approaches have been proposed in the prior art where high precision optical fiber arrays are more specifically adapted for dealing with larger numbers of fibers and two dimensional fiber arrays. For example, U.S. Pat. No. 5,907,650 to Sherman et al. teaches a high precision optical fiber array connector and method. In a most notable embodiment, the fibers are arrayed and positioned via openings of two masks spaced by a sandwiched layer. The openings are fabricated by laser cutting. A plurality of optical fibers include fiber ends having substantially truncated conical side surfaces that extend through the openings. When the conical surfaces engage the mask opening walls, a bonding material is applied to the mask forward face and exposed tips. After curing of the bonding material, the forward face is grinded and polished such that the exposed tips are made planar with the bonding material. The invention requires conical shaping of the fiber ends. Etching techniques are described as primary conical shaping techniques. The centering of a single fiber within an opening is accomplished as a line contact between the conically shaped cladding and an opening edge, which may result in damage of the cladding and an eventual loss in alignment precision. Also, all fibers have to be held with a certain force inside the openings to assure contact between the conical cladding and the corresponding opening edge during curing of the bonding material. In cases with a high number of fibers it may be difficult to hold each individual fiber with the required force during the curing process. The conical shape of the fiber ends is required for finding the openings and for centering the fiber ends in the assembly position. Damages of the fiber ends may occur as an eventual result of failed assembly attempts. Therefore, there exists a need for a method and apparatus that provides precise alignment of optical fibers without special treatment and/or fabrication effort of the fiber ends. The present invention addresses this need.

U.S. Patent Application Publication 2001/0051028 to Gutierrez et al. aims at providing a high-density fiber terminator/connector. The terminator/connector and method of making it comprise using deep reactive ion etching to etch a plurality of holes in a silicon substrate and placing fibers in the holes. The holes can be cylindrical in shape or non-cylindrical. Micro-machined kinematical alignment mechanisms or locators may be provided to position the optical fibers at the centers of the holes. The alignment mechanism includes elastic flaps concentrically placed around the assembled fibers and are intended to snuggly hold the fibers in position. Since the flaps deflect angularly a snuggly contact is questionable. Also, the flexible nature of the alignment mechanism may render it sensitive to bending momentums induced by the fibers themselves. To keep such bending moments to a minimum, pre alignment of the fibers is provided by slim conical hole sections fabricated below the flaps. Unfortunately, such slim conical hole sections result in a relatively small entry diameter making an insertion of the fiber end difficult to accomplish. Therefore, there exists a need for a structure that provides for an independent dimensioning of an insertion cone. The present invention addresses this need.

Although the teachings of Sherman and et al. and Gutierrez et al. address a number of the challenges in the way of a high precision array of optical fibers, their solutions are not sufficiently precise and robust for large arrays of optical fibers. What is needed is an optical fiber array that can accommodate a large number of fibers, achieve hermetic sealing and preserve excellent alignment of the fibers including planarity, parallel alignment, relative position between the fibers as well as absolute position of fibers in the array. Furthermore, it would be highly advantageous if such array would permit tuning of the orientation of the array in the holder.

OBJECTS AND ADVANTAGES

In view of the shortcomings of the prior art, it is an object of the present invention to provide an apparatus for holding optical fibers in an array that satisfies the requirements of high alignment precision between fibers themselves and with respect to external devices. Specifically, the device of the invention is to provide excellent planarity, parallel alignment, relative position and absolute position of the optical fibers of the array.

It is another object of the invention to ensure that the device be sufficiently robust such that the precisely aligned fibers preserve their alignment over time.

It is yet another object of the invention to provide for a hermetic seal between the fibers, and especially the fiber ends and the external environment.

It is another object of the invention to provide the fiber housing with hermetic sealing from the external environment of the apparatus while attached to the apparatus Still another object of the invention is to provide a mechanism for tuning the orientation of the array in the device.

These and other objects and advantages will become apparent upon reading the following description.

SUMMARY

The objects and advantages of the invention are achieved with the aid of an insert for holding at least one optical fiber, and typically a large array of optical fibers. The insert has a top plate, a bottom plate and a spacer plate in the middle. An array of feedthroughs is provided by the insert for easily receiving and precisely positioning optical fibers. Each feedthrough includes two narrow hole sections on both ends of a wide hole. The wide hole is formed into the spacer plate, the narrow hole sections are fabricated in the top plate and the bottom plate. Adjacent to each narrow hole section is an expanding hole section that operates as a funnel during insertion of a fiber in the feedthrough. A fiber end is easily inserted in a feedthrough since the expanding sections capture the fiber end and center it on the narrow hole sections while the fiber end is moved forward. Consequently, a large number of fibers may be easily inserted and tightly positioned within the insert without need to particularly shape the fiber ends. Also, there is no need to hold the fiber ends in a certain position along the feedthroughs' axes during the bonding of the fibers in the insert. This additionally simplifies the assembly procedure.

Spacing the two narrow hole sections apart provides for two defined positions for each fiber end. The orientation of the fiber end at the level of the output face remains substantially unaffected by eventual bending of the fiber in the proximity of the insert that might occur prior to bonding the fibers. As an advantageous result, the tilting of the fiber in the two narrow hole sections is so small that may be neglected.

In a preferred embodiment, the insert is employed in an apparatus designed for holding an optical fiber or an array of optical fibers. The apparatus has a fiber housing for mounting the insert. In one embodiment, the fiber housing has a front portion and the insert is mounted on the front portion. The fiber housing provides hermetic sealing from the external environment of the apparatus while attached to the apparatus.

The external housing has a glass plate disposed in a plane-parallel orientation relative to the insert. Thus, when the fiber housing is placed inside the external housing the glass plate is located parallel and next to the output face. Furthermore, in order to ensure proper optical out-coupling from the optical fibers, an optical gel is interposed between the glass plate and the insert.

A lens plate is positioned on top of the glass plate. The lens plate has a number of lenses arrayed in correspondence to the feedthrough array. Precise positioning of the lens plate is provided by an adjustment device that holds the lens plate while optical tests are performed. Once the optimal position of the lens plate is set, the lens plate is soldered to the external housing.

The details of the invention are presented in the below description with reference to the attached drawing figures.

BRIEF DESCRIPTION OF THE FIGURES

FIGS. 2a, 2b illustrate a cross-sectional view of a feedthrough of the insert of FIG. 1. FIG. 2a shows an ideal assembly condition of the insert's individual plates and a fiber end. FIG. 2b shows an exemplary worst-case assembly condition.

DETAILED DESCRIPTION

Figure 1:
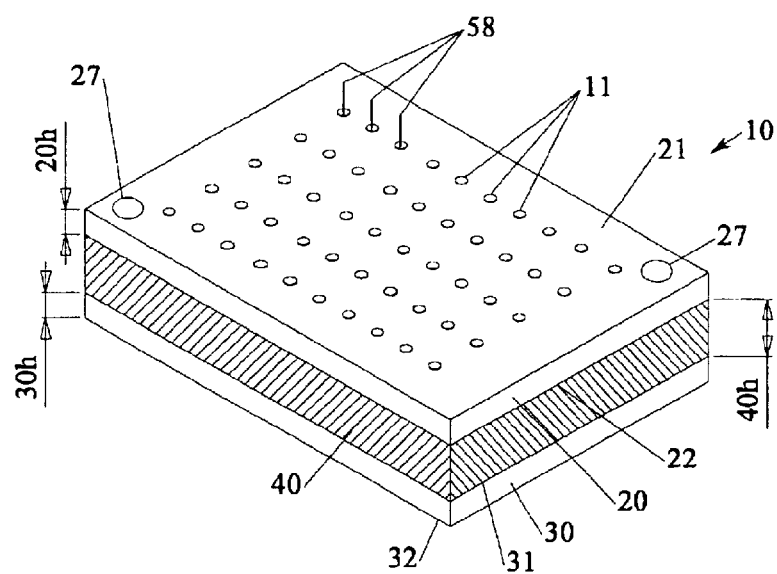
FIG. 1 depicts an isometric view of an insert in accordance with the invention.

The invention will be best understood by initially referring to an insert 10 as show in FIG. 1. Insert 10 has a top plate 20 and a bottom plate 30. A spacer plate 40 is sandwiched between plates 20, 30. All plates 20, 30, 40 are preferably made of silicon wafers or other suitable material. In the present embodiment, plates 20, 30 have a height 20h and 30h of about 500 μm, and spacer plate 40 has a height 40h of about 1,000 μm. Even though this heights 20h, 30h, and 40h have proven advantageous for the purposes of the present invention, the scope of the invention is not limited by specific values of them.

The insert 10 has a number of feedthroughs 11, which are explained in more detail in FIGS. 2a and 2b. The feedthroughs 11 hold the fiber ends 58. The insert 10 is dimensioned to provide sufficient space for a predetermined number of fiber ends 58 fixedly held preferably in rows and columns. An exemplary insert 10 may have about 30 rows and 40 columns. Minimizing the spacing between the feedthroughs 11 is limited by a minimum amount of contact area between the plates 20, 30, 40 to assure proper bonding of them. In the preferred embodiment, the spacing between individual feedthroughs 11 is about 1000 μm. The insert 10 also provides a peripheral area without feedthroughs 11. Along this peripheral area the insert 10 is bonded with its insertion face 32 to a fiber housing 60 (see FIGS. 3, 6).

Top plate 20 has an output face 21 at which optical beams are emitted and/or received by the fiber ends 58, which are shown in FIG. 1 as extending above the output face 21 as it may be the case during an intermediate assembly step as is described further below.

The plates 20, 30, 40 are bonded together in a well-known fashion. The top plate 20 is bonded with its first attaching face 22 to the top of the spacer plate 40 and the bottom plate 30 is bonded with its second attaching face 31 to the bottom of the spacer plate 40. At the bottom of the bottom plate 30 is an insertion face 32 where the fiber ends 58 are inserted during assembly. Alignment holes 27 are fabricated in each of the plates 20, 30, 40 to provide accurate alignment prior to the well-known bonding of them.

Referring now to the cross-sectional views of FIGS. 2a and 2b the elements of a single feedthrough 11 are explained in detail. In order to precisely position the fiber end 58 at the level of the output face 21, a sufficient length of the fiber end 58 needs to be fixedly held. This is particularly important in cases, where the feedthrough 11 has to have sufficiently wide cross section(s) to provide for an easy assembly.

Unfortunately, the effort and cost for fabricating precise holes increase more than proportional with the hole depth. In the present invention, this problem is addressed by providing first and second narrow hole sections 24, 34 positioned along the upper and lower end of the feedthrough 11. In that way, the narrow hole sections 24, 34 are fabricated only with their depths 24h, 34h while a positioning relevant feedthrough height 11h is provided. In an exemplary embodiment, the depths 24h, 34h may be in the range between 100 μm and 200 μm and the feedthrough height 11h in the range between 1600 μm and 1700 μm. As can be seen in FIG. 2b, the feedthrough height 11h sums from top plate height 20h, spacer plate height 40h and second narrow hole height 34h.

Postioning precision includes an angular offset 50a, which is defined as the angle between the fiber end's 58 axis 50x and a normal of the output face 21. In FIG. 2b, the offset angle 50a is drawn between the fiber axis 50x and the first hole axis 24x, which is also normal to output face 21. For the purpose of the present invention it is desirable to keep the angular offset 50a to a minimum.

Since the insert 10 is fabricated from individual plates 20, 30, 40, positioning inaccuracies between the individual plates 20 and 30 may result in an offset 11o between the narrow hole axes 24x and 34x. The offset 11o eventually contributes to the angular offset 50a. The oversize of the narrow hole sections 24, 34 may also contribute to the angular offset 50a. In that context, FIG. 2b depicts a worst-case assembly condition where misalignment between the plates 20, 30 and hole oversizes add up in the most unfavorable fashion. In such case, a maximum for the angular offset 50a may be defined by the following Equation [1] wherein FH stands for the feedthrough height 11h, T equals the top hole diameter 24d, B equals the bottom hole diameter 34d, D equals the fiber end diameter 52d, FO equals the feedthrough offset 11o, and α the angular offset 50a.

$$\alpha = \text{arctg}\,(FO+T+B-2D/FH) \qquad [1]$$

A well-known result of the angular offset 50a is a degradation of the optical signal propagating in and/or out of the fiber end 58, which may be called insertion loss. The following Table A lists exemplary values for the insertion loss in dependence of the contributing elements as presented in the Equation [1]. IL represents the insertion loss in Table A. As can be seen in Table A, the second narrow section 34 may have a slightly large diameter than the first narrow section 24. During insertion of fiber ends 58 in the first narrow section 24 the fiber ends are already pre aligned by the second narrow section 34 providing for a tighter fit of the fiber end 58 at the output face 21 without inhibiting the insertion of it.

TABLE A

| T [μm] | B [μm] | FH [μm] | FO [μm] | D [μm] | α [degrees] | IL [dB] |
| --- | --- | --- | --- | --- | --- | --- |
| 127.9 | 129.9 | 1510.0 | 6.0 | 125.0 | 0.40 | 0.09 |
| 127.9 | 129.9 | 1610.1 | 6.0 | 125.0 | 0.37 | 0.08 |
| 127.9 | 129.9 | 1710.0 | 6.0 | 125.0 | 0.35 | 0.07 |
| 127.9 | 129.9 | 1810.0 | 6.0 | 125.0 | 0.33 | 0.06 |
| 127.9 | 129.9 | 1910.0 | 6.0 | 125.0 | 0.32 | 0.06 |
| 127.9 | 129.9 | 2010.0 | 6.0 | 125.0 | 0.30 | 0.05 |

Efficiency of the fiber end's 58 preparation and insertion in the feedthrough 11 is the key to large numbers of fiber ends 58 assembled in a single insert 10. Costly conical shaping of the fiber ends 58 needs to be avoided. Also, the precision with which the fiber end 58 is approached for insertion needs to be kept as low as possible. To accommodate for these needs, a first expanding section 25 is fabricated into the attachment face 22 and a second expanding section 35 is fabricated into the insertion face 32. Both expanding sections 25, 35 are substantially aligned with their adjacent narrow sections 24, 34 such that a first through hole 23 is provided in the top plate 20 and a second through hole 33 is provided in the bottom plate 30.

The expanding sections 25, 35 have a funnel angle 25a, 35a, which is fabricated by a wet etch operation. As is well-known in the art, the angle created by the wet etch is dependent on the crystallographic orientation of the wafer. In the present invention, preferably a wafer with 1-0-0 crystallographic orientation is used, which produces funnel angles 25a, 35a of 115°. This angle provides sufficient funnel widths 25d, 35d for given section heights 25h, 35h. At the same time, the expanding sections 25, 35 are sufficiently steep such that the tip of the fiber end 58 may slide along their walls towards the narrow sections 24, 34. The fiber tip does not require special shaping and can be inserted when approached within the widths 25d, 35d.

In the preferred embodiment, the cladding 51 is removed from the fiber end 58 prior to assembly and only a bare fiber 52 is inserted in the feedthrough 11. The scope of the invention includes embodiments where the narrow hole diameters 24d, 34d are dimensioned to capture the bare fiber 52.

The central portion of the feedthrough 11 is provided by the spacer hole 41 fabricated into the spacer plate 40 with a uniform diameter 41d that roughly corresponds to the width 25d. Since the hole 41 does not contribute to the positioning of the fiber end 58, it may be fabricated with reduced precision and consequently with reduced effort and cost. Whereas narrow hole sections 24, 34 are fabricated with highest precision using masks and a deep reactive ion etch.

Figure 3:
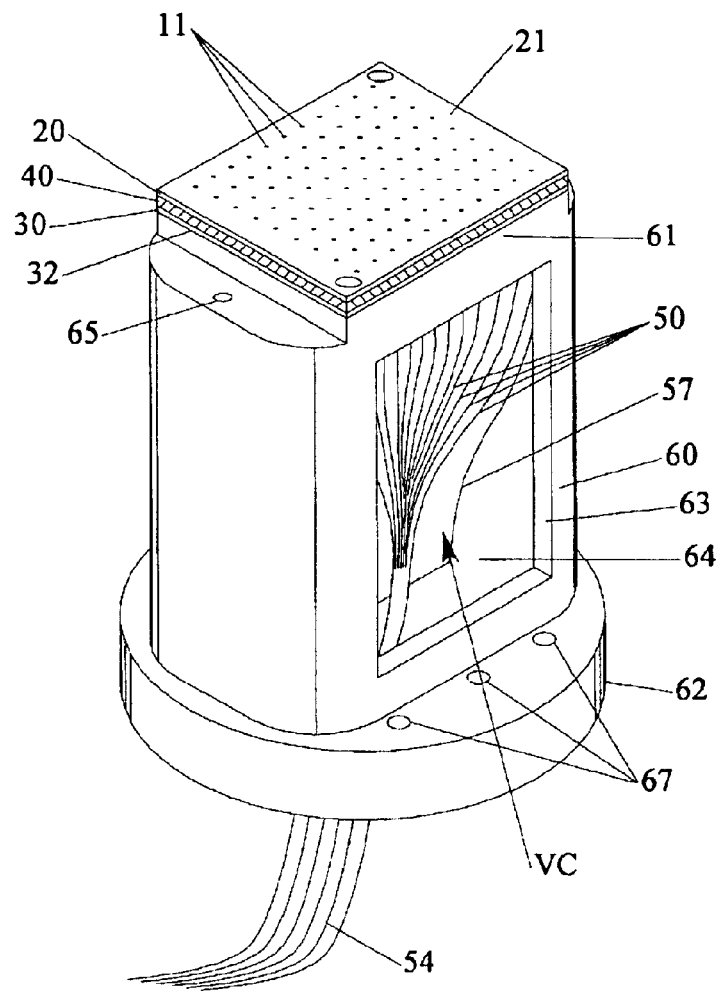
FIG. 3 shows a perspective view of the insert of FIG. 1 attached to a fiber housing.

Now, referring to FIG. 3 it is described in detail how the feedthrough 11 is utilized to easily assemble large arrays of fiber ends 58 on the insert 10. The teachings presented above for a single feedthrough 11 apply to an entire feedthrough array distributed in the insert 10 as is exemplarily shown in FIGS. 1, 3. To take advantage of the reduced assembly accuracies provided by the expanding sections 25, 35 a number of fiber ends 58 may be arrayed prior to insertion. A flexible sheet 57 may elastically hold a number of optical fibers 50 (see FIGS. 3, 6) fanning out from a fiber string 54 at one end such that a number of fiber ends 58 stick out at the opposing other end in a substantially parallel fashion and with a spacing that corresponds approximately to the spacing of a single row of feedthroughs 11.

The accuracy of the spacing between the fiber ends 58 arrayed on the sheet 57 has to be merely within the range of the second funnel width 25d. A multitude of fiber ends 58 may be inserted simultaneously with an effort comparable to that for inserting a single fiber end 58. In a case where forty fiber ends 58 are provided on a single sheet 57, the insertion process may be substantially shortened also by a factor forty. This example is solely presented for demonstrating a main advantage of the present invention without any claim of accuracy thereof. Details about the sheet 57 and the associated parts are found in the U.S. patent application Ser. No. 09/866,063, filed May 21, 2002, which is hereby incorporated by reference.

The insert 10 is a very thin and fragile structure. To integrate it in a larger assembly it is circumferentially attached in a well-known fashion on the top portion 61 of the fiber frame 60. The expanding sections 35 remain freely accessibly at the inside of the fiber frame 60. The fiber frame 60 has a lengthy shape extending in insertion direction away from the insertion face 32. At the opposing end, the fiber frame 60 has a flange structure 62 with first assembly holes 67. The fiber frame 60 features further a window 63 through which a number of sheets 57 may be accessed and held for insertion by a vacuum holding device (not shown). The window 63 is also placed and dimensioned to provide visual contact to the insertion face 32 as indicated by arrow VC.

During an initial assembly step, the fiber frame 60 is fixedly held upside down. A sheet 57 is inserted in the fiber frame 60 and temporarily fixed to the vacuum holding device. The vacuum device is moved such that the arrayed fiber ends 58 are in approximate alignment with their predetermined expanding sections 25. Visual monitoring through the window 63 assures proper alignment and insertion of the array of fiber ends 58.

Once the fiber ends 58 are inserted, gravity keeps them in place and the process may be repeated until the insert is populated with fiber ends 58 in a predetermined fashion. Some feedthroughs 11 may remain unpopulated.

Once the insertion process is completed, a first resin may be poured onto the insertion face 32, which is still pointing upwards. After a sufficient curing period, the fiber frame 60 may be turned around such that the output face 21 points upwards. At that assembly stage, the previously applied first resin is cured and fixedly holding the fiber ends 58 within their feedthroughs 11.

In a following step, a temporary barrier (not shown) is placed around the insert. The temporary barrier rises sufficiently above the level of the output face 21 such that a second resin poured onto the output face 21 is prevented from running off. Immediately following the pouring of the second resin, a vacuum is applied to the uncured second resin such that air eventually trapped in the feedthroughs 11 and beneath the second resin may travel to the top. The second resin may outgas and bubble during vacuum application. The vacuum is applied for a short period only such that the second resign may have sufficient time to settle down before the curing begins. Air bubbles and bubbles from outgasing have enough time to travel to the top of the resign away from the output face 21.

After the second resin has cured completely, the temporary barrier is removed. Then, the portions of the second resign and the fiber ends 58 that extend above the output face 21 are removed too. The output face 21 is finally polished whereby a planar and smooth surface is created between the output face 21, the tips of the fiber ends 58 and the second resign filling the gap between the fiber ends 58 and the first narrow section 24. Eventually unpopulated feedthroughs 11 are filled by the second resign as well. The final subassembly includes the fiber frame 60, the insert 10 and a number of optical fibers 50 terminating in the fiber ends 58 on one end and well-known optical connectors on their other ends.

Figure 4:
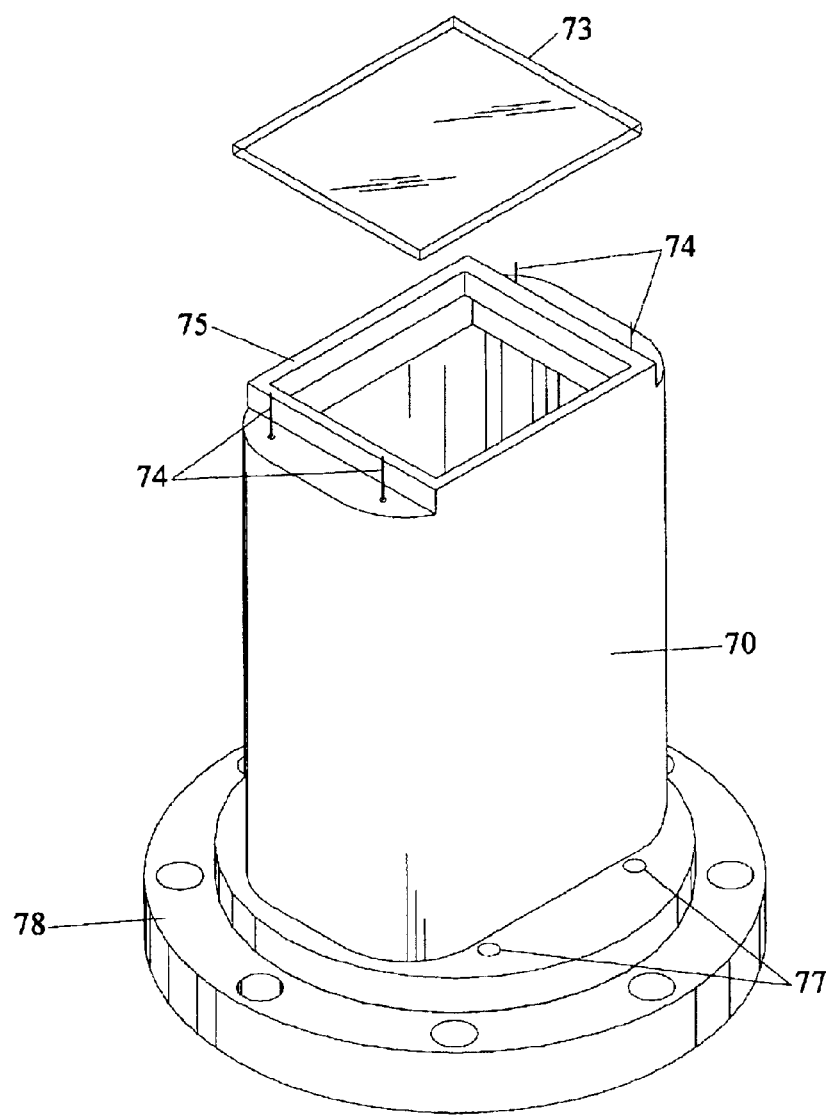
FIG. 4 depicts an external housing with a glass plate.

The insertion loss is highly influenced by the surface quality of the fiber ends' 58 tips. Only the slightest scratches, deposits and/or corrosion result in significant disturbance in the beam propagation. To provide optimum protection of the polished output face 21, a glass plate 73 (see FIGS. 4, 5, 6) is placed on top of the output face hermetically sealing it off. The process by which this is accomplished is best explained by referring now to FIG. 4.

To successfully seal the output face 21, an optical gel 66 (see FIG. 5) fills the gap between the glass plate 73 and the output face 21. The optical gel 66 has preferably a refractive index that substantially matches the refractive index of the glass plate 73. Entrapped air bubbles need to be avoided in order to assure undisturbed beam propagation through the gel 66 and the glass plate 73. For that purpose and for providing additional sealing of the insert's 10 circumference, an external housing 70 is provided for receiving the pre assembled fiber frame 60 as described under FIG. 3.

Prior to assembling the fiber frame 60, the glass plate is bonded to a flange 75 in a fashion similar to that of the insert 10 bonded to the fiber frame 60. The external housing 70 features also assembly holes 77 that correspond to the fiber frame's holes 67 and a flange structure 78 for integrating the final apparatus in another device like, for example, an optical relay station. Solder pins 74 are placed adjacent the flange 75. Their function is explained below with FIG. 6.

After the glass plate 73 has been bonded to the external housing 70, the optical gel 66 may be applied to the polished output face 21. An inventive procedure and apparatus for applying the gel 66 on the output face 21 are described in the concurrently filed U.S. patent application titled "Method and Apparatus for applying an optical gel" of Janusz Liberkowski, which is hereby incorporated by reference.

Figure 5:
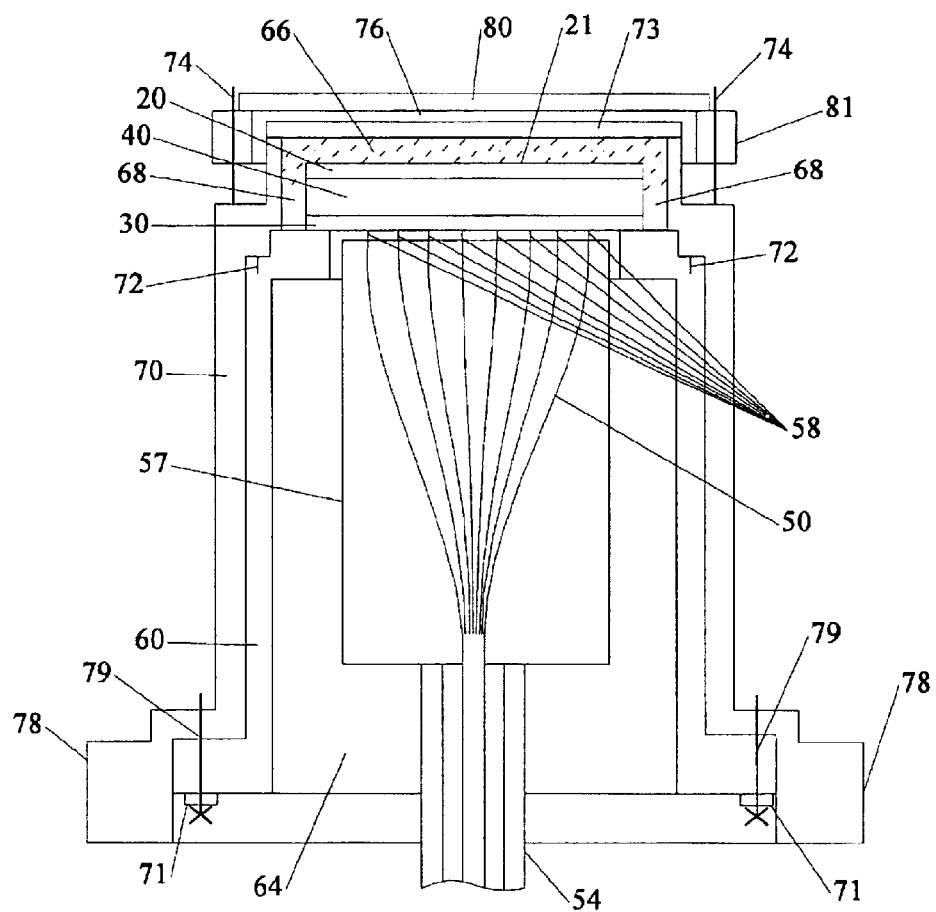
FIG. 5 shows a schematic section view of the final apparatus.

After the optical gel 66 is applied, the fiber frame 60 is inserted in the external housing 70, as shown in FIG. 5. To position the fiber frame 60 inside the external housing 70, well-known alignment features like, for example, alignment pins 72 of the external housing 70 and corresponding alignment holes 65 (see FIG. 3) of the fiber frame 60 may be utilized. Attachment screws 79 screwed in the assembly holes 67, 77 force the output face 21 against the inside of the glass plate 73. Elastic members 71 may be eventually used to gradually squeeze the optical gel 66 out of the gap into a cavity 68 surrounding the insert 10. The surrounding cavity 68 is formed by the insert's 10 circumference, the fiber housing 60 and the external housing 70.

FIG. 5 shows also a lens plate 80 being assembled on top of the glass plate 73. An air gap 76 remains between the glass plate 73 and the lens plate 80. The lens plate is bonded to a frame 81, which is soldered to pins 74 of the external housing 70 after proper positioning of the lens plate 80.

Figure 6:
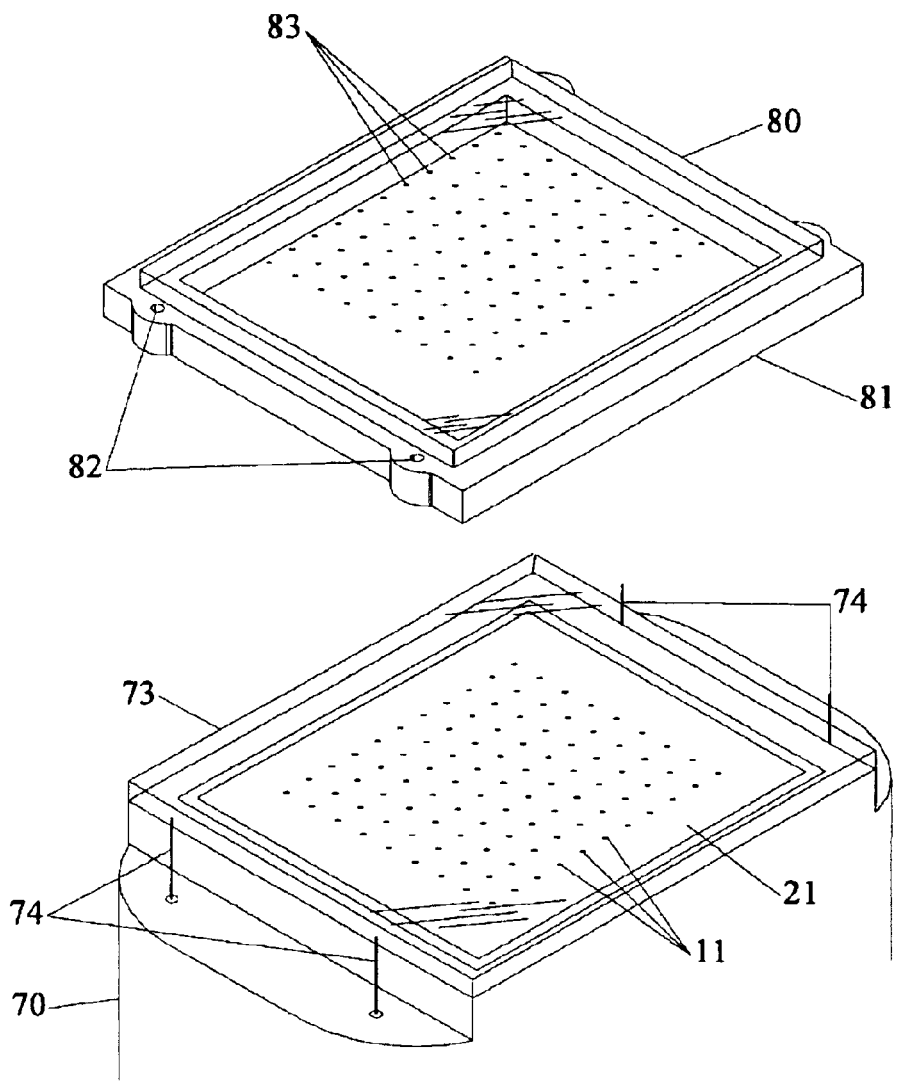
FIG. 6 illustrates a lens plate and the upper portion of the external housing of FIG. 4 with the glass plate attached to it. Through the glass plate is visible the insert of the assembled fiber housing.

Now referring to FIG. 6, the process of positioning and fixing the lens plate 80 is described. A number of individual lenses 83 are arrayed on the lens plate 80 in conjunction with the array of feedthroughs 11. In an initial well-known step the lens plate 80 is aligned relative to the external housing 70 such that the lenses 83 are substantially aligned with the fiber axes 50x. Precise positioning of the lens plate 80 is provided by an adjustment device that holds the lens plate while optical tests are performed.

Once the lenses 83 are aligned, the lens plate 83 is plan parallel moved in a direction substantially perpendicular to the output face 21 until the emitting light is properly focused by the lenses 83. During this focusing steps a mirror is placed at a predetermined focal plane of the final assembly. The mirror reflects the emitted light back through the lenses 83. As the lenses 83 approach their predetermined assembly position, the emitted light is increasingly focused, which results in a gain of the light mirrored back into the fiber end 58. Once the reflected light reaches a maximum, the lens plate 80 is properly positioned.

During the alignment procedure, the solder pins 74 extend into the solder holes 82 without touching them. After the alignment is completed the position of the lens plate 80 is fixed by soldering the pins 74 within the holes 82.

An additional important utility of the external housing 70 is its sealing function within an optical device like, for example, an optical switching fabric. For that purpose, a seal may be placed on the attachment flange 78 that assists in hermetically sealing the interior of the optical device while the optical connector of the present invention is attached to it.

Accordingly, the scope of the invention described in the specification above is set forth by the following claims and their legal equivalent.

What is claimed is:

1. An apparatus for hermetically holding at least one optical fiber, said apparatus comprising:
   a. an insert comprising:
      i. a top plate having an output face, a first attaching face and a first through hole having a first narrow section terminating at said output face and a first expanding section expanding towards and terminating at said attaching face;
      ii. a bottom plate having a second attaching face, an insertion face and a second through hole having a second narrow section terminating at said attaching face and second expanding section expanding towards and terminating at said insertion face;
      iii. a spacer plate sandwiched between said first attaching face and said second attaching face, said spacer having a third through hole of a diameter larger than said first narrow section and said second narrow section;

wherein said first through hole, said second through hole and said third through hole being positioned relative to each other such that a feedthrough is provided such that said fiber approaching said second expanding section is guided towards said second narrow section and such that said fiber approaching said top plate through said third hole is captured by said first expanding section and guided towards said first narrow section; and
   b. a glass plate hermetically connected to said output face via an optical gel such that an end of said fiber is hermetically sealed while said fiber is finally bonded within said feedthrough.

2. The apparatus of claim 1, wherein said top plate is made of a silicon wafer having a 1-0-0 crystallographic orientation such that said first expanding section has a taper angle of 57.5 degrees off normal.

3. The apparatus of claim 1, wherein said bottom plate is made of a silicon wafer having a 1-0-0 crystallographic orientation such that said second expanding section has a taper angle of 57.5 degrees off normal.

4. The apparatus of claim 1, wherein a number of said feedthroughs are arrayed and spaced in correspondence with an combined array of a number of said optical fibers.

5. The apparatus of claim 1, wherein said insert is attached at a fiber housing.

6. The apparatus of claim 5, wherein said fiber housing has a lateral opening for holding said optical fiber during said approaching of it.

7. The apparatus of claim 5, wherein said glass plate is attached at an external housing configured in conjunction with said fiber housing such that said insert is positioned in a substantially parallel relation to said glass plate.

8. The apparatus of claim 7, wherein said external housing and said fiber housing further comprise:
   a. a cavity surrounding said insert, said cavity being formed by said external housing together with said fiber housing; and
   b. a tensioning means for applying a compressive force via said glass plate and said output face onto said optical gel in uncured configuration such that an excess amount of said uncured optical gel flows into said surrounding cavity.

9. An apparatus for hermetically holding fiber ends, said apparatus comprising:
   a. an external housing having a glass plate;
   b. an internal structure including:
      i. an combined array of said fiber ends, said fiber ends continuing as optical fibers;
      ii. a three plate insert having an array of feedthroughs holding said fiber ends opposite to said glass plate, at least one of said feedthroughs positioning one of said fiber ends in a first narrow hole section of an insert's top plate and in a second narrow hole section of an insert's bottom plate;
      iii. a fiber housing for holding said three plate insert and for interlocking with said external housing; and
   c. an optical gel filling a gap between said glass plate and said insert.

10. The apparatus of claim 9, wherein said top plate has a first expanding hole section substantially aligned with said first narrow hole section and expanding towards an insertion direction of at least one of said fiber ends.

11. The apparatus of claim 9, wherein said bottom plate has a second expanding hole section substantially aligned with said second narrow hole section and expanding towards an insertion direction of at least one of said fiber ends.

12. An apparatus for holding at least one optical fiber, said apparatus comprising:
  a) a top plate having an output face, a first attaching face and a first through hole having a first narrow section terminating at said output face and a first expanding section terminating at said attaching face;
  b) a bottom plate having a second attaching face, an insertion face and a second through hole having a second narrow section terminating at said second attaching face and a second expanding section terminating at said insertion face;
  c) a spacer plate sandwiched between said first attaching face and said second attaching face, said spacer plate having a third through hole of wide uniform diameter aligned with said first through hole and said second through hole such that said at least one optical fiber has a feedthrough from said insertion face to said output face;
  d) a fiber housing for mounting said insert; and
  e) an external housing for hermetically sealing an interior of an optical device while said apparatus is attached to said optical device, wherein said external housing comprises a glass plate disposed in a plane-parallel orientation with said insert.

13. The apparatus of claim 12, further comprising an optical gel interposed between said glass plate and said insert.

14. An apparatus for holding at least one optical fiber, said apparatus comprising:
  a) a top plate having an output face, a first attaching face and a first through hole having a first narrow section terminating at said output face and a first expanding section terminating at said attaching face;
  b) a bottom plate having a second attaching face, an insertion face and a second through hole having a second narrow section terminating at said second attaching face and a second expanding section terminating at said insertion face;
  c) a spacer plate sandwiched between said first attaching face and said second attaching face, said spacer plate having a third through hole of wide uniform diameter aligned with said first through hole and said second through hole such that said at least one optical fiber has a feedthrough from said insertion face to said output face;
  d) a fiber housing for mounting said insert; and
  e) an external housing for hermetically sealing an interior of an optical device while said apparatus is attached to said optical device, wherein said external housing comprises a lens plate having at least one lens for focusing a light beam traveling along an optical axis of said at least one optical fiber.

15. The apparatus of claim 14, further comprising a means for fixing said lens plate in a tuned position.

16. An apparatus for holding at least one optical fiber, the apparatus comprising an insert comprising:
  (a) a top plate having an output face, a first attaching face and a first through hole, the first through hole comprising
    a non-tapered portion extending from the output face to an intermediate position between the output face and the first attaching face, and
    a tapered portion extending from the intermediate position to the first attaching face;
  (b) a bottom plate having a second attaching face, an insertion face and a second through hole, the second through hole comprising
    a tapered portion extending from the insertion face to an intermediate position between the insertion face and the second attaching face, and
    a non-tapered portion extending from the intermediate position to the second attaching face;
  (c) a spacer plate sandwiched between the first attaching face and the second attaching face, the spacer plate having a third through hole of wide uniform diameter aligned with the first through hole and the second through hole such that the at least one optical fiber has a feedthrough from the insertion face to the output face;
  (d) a fiber housing for mounting the insert; and
  (e) an external housing for hermetically sealing an interior of an optical device while the apparatus is attached to the optical device, the external housing comprising a glass plate disposed in a plane-parallel orientation with the insert.

17. The apparatus of claim 16 wherein the non-tapered portion of the first through hole has a first uniform diameter and the non-tapered portion of the second through hole has a second uniform diameter larger than the first uniform diameter.

18. The apparatus of claim 17 wherein the first uniform diameter is essentially equal to a fiber diameter of the optical fiber.

19. The apparatus of claim 16 wherein the fiber housing comprises a front portion and the insert is mounted on the front portion.

20. The apparatus of claim 16, further comprising an optical gel interposed between the glass plate and the insert.

21. The apparatus of claim 16 wherein the external housing comprises a lens plate having at least one lens for focusing a light beam traveling along an optical axis of the at least one optical fiber.

22. The apparatus of claim 21, further comprising a means for fixing the lens plate in a tuned position.

23. The apparatus of claim 16 wherein a number of the at least one optical fibers are combined with a first spacing in a fiber array and wherein a number of the feedthroughs are provided with a second spacing corresponding to the first spacing, such that fiber ends of the fiber array may be simultaneously inserted into the number of the feedthroughs.

* * * * *